(12) United States Patent
Ellison

(10) Patent No.: US 7,689,756 B2
(45) Date of Patent: Mar. 30, 2010

(54) APPARATUS AND SYSTEM FOR AN ADDRESS TRANSLATION DEVICE

(75) Inventor: Brandon J. Ellison, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 12/142,667

(22) Filed: Jun. 19, 2008

(65) Prior Publication Data

US 2008/0256276 A1    Oct. 16, 2008

Related U.S. Application Data

(63) Continuation of application No. 11/324,435, filed on Jan. 3, 2006, now Pat. No. 7,444,453.

(51) Int. Cl.
*G06F 13/36* (2006.01)

(52) U.S. Cl. ...................... 710/311; 370/360

(58) Field of Classification Search ................ 710/106, 710/306, 311, 312, 314; 370/360
See application file for complete search history.

(56) References Cited

U.S. PATENT DOCUMENTS

| | | | |
|---|---|---|---|
| 6,134,665 A | 10/2000 | Klein et al. | |
| 6,260,127 B1 | 7/2001 | Olarig et al. | |
| 6,298,370 B1 | 10/2001 | Tang et al. | |
| 6,438,054 B1 | 8/2002 | Kanazashi | |
| 6,530,007 B2 | 3/2003 | Olarig et al. | |
| 2001/0004753 A1 | 6/2001 | Dell et al. | |
| 2002/0133655 A1 | 9/2002 | Falik et al. | |
| 2003/0088805 A1 | 5/2003 | Majni et al. | |
| 2003/0191809 A1 | 10/2003 | Mosley et al. | |
| 2003/0191848 A1 | 10/2003 | Hesselink et al. | |
| 2003/0231702 A1 | 12/2003 | Oates et al. | |
| 2005/0002384 A1 | 1/2005 | Larson et al. | |
| 2005/0246475 A1 | 11/2005 | Ervin | |

OTHER PUBLICATIONS

"Identical I2C Components Sharing a Unique I2C Address" by International Business Machines Corporation, Research Disclosure, Sep. 1998/1245.

*Primary Examiner*—Clifford H Knoll
(74) *Attorney, Agent, or Firm*—Kunzler & McKenzie

(57) ABSTRACT

An apparatus, system and method to facilitate I2C communication between a host device and a slave device where the slave device shares a common physical address with another slave device on the I2C bus. The apparatus includes a detection module to detect an incoming address on the I2C bus, a translation module to translate the incoming address to an outgoing address, and a communication module to communicate data between the host device and the slave device where the outgoing address matches the physical address of the slave device. In this manner, the present invention avoids address conflicts between commonly addressed slave devices while reducing costs, components, and complexities traditionally associated with dynamic addressing techniques and other prior art solutions to address conflicts.

18 Claims, 7 Drawing Sheets

APPARATUS AND SYSTEM FOR AN ADDRESS TRANSLATION DEVICE

CROSS-REFERENCE TO RELATED APPLICATIONS

This application is a continuation of and claims priority to U.S. patent application Ser. No. 11/324,435 entitled "I2C Address Translation Device" and filed on Jan. 3, 2006 now U.S. Pat. No. 7,444,453 for Brandon J. Ellison, which is incorporated herein by reference.

BACKGROUND

1. Field of the Invention

The invention relates to addressing systems. Specifically, the invention relates to apparatus, systems, and methods to avoid address conflicts between slave devices sharing a common physical address and communicating with a host device over an I2C bus.

2. Description of the Related Art

Widespread acceptance and success of the Inter-Integrated Circuit bus ("I2C bus") has emerged as a result of its simplicity of design and protocol format. Originally developed to connect a CPU to peripheral chips in a television set, the I2C bus is a simple bi-directional two-wire interface that provides efficient inter-integrated circuit ("IC") control. Physically, the I2C bus includes two active wires, a serial data line ("SDA") and a serial clock line ("SCL"). As both active wires are "open drain" drivers, a set of pull-up resistors may be implemented to enable each line to be pulled high as needed.

The I2C interface is a simple master/slave type interface where the maximum number of slave devices connected to the I2C bus is dictated by the maximum allowable capacitance on the lines, as well as by the protocol's addressing limit. Typically, the I2C bus includes one master and multiple slave devices, though a multi-master system is possible. In any case, any device on the bus may act as a receiver and/or transmitter depending on its functionality, although only the master initiates and controls the data transfer.

According to standard I2C operation, the master device initiates communication with a slave device by placing a start sequence on the bus, followed by an address uniquely corresponding to the slave device. In this manner, all slave devices are initially alerted to incoming data, but only the device having an address matching the transmitted address communicates with the master device.

Servers typically implement numerous I2C slave devices to perform various functions, including hardware monitors, clock generators, in/out ("I/O") devices, and memory storage devices such as random access memory ("RAM") and selectrically erasable programmable read-only memory ("EEPROM"). A problem often arises, however, when more than one of the same slave device is plugged into one chassis. Each slave device in a server chassis generally contains an EEPROM storing serial numbers and field replaceable unit ("FRU") information. Most off-the-shelf EEPROMs, however, reside in the same 8-bit addressing range, 0xA0-0xAF, for example. Accordingly, multiple identical slave devices incorporating off-the-shelf EEPROMs typically share a single common address.

For example, more than one Ethernet Switch Module may be plugged into the same IBM® eServer® BladeCenter™ unit. In such a case, multiple Ethernet Switch Modules, each identified by a single common address, may be put on the same I2C bus. As a result, data destined for a particular Ethernet Switch Module may be inadvertently received by another Ethernet Switch Module, thus compromising accurate and efficient data transmission.

One solution to this problem is to implement multiple I2C buses, each bus corresponding to exactly one multiple device. In this manner, each multiple device is independently and uniquely recognized by its corresponding bus. While effective to avoid address conflicts between multiple devices, this solution multiplies both the costs and components necessary for I2C data transfer between a host device and multiple identical slave devices. Other solutions include various methods of dynamic addressing, such as implementing multiplexors to reside on a single I2C bus common to the multiple devices. These solutions, however, complicate the software needed to access each of the multiple devices while increasing data transfer time as well as associated costs.

From the foregoing discussion, it should be apparent that a need exists for an apparatus, system, and method to avoid address conflicts between multiple slave devices communicating with a host device over a single I2C bus. Beneficially, such an apparatus, system, and method would increase efficient and reliable I2C data transfer from the host device to an intended slave device while minimizing costs and complexities associated with dynamic I2C addressing techniques and other prior art solutions. Such an apparatus, system, and method is disclosed and claimed herein.

BRIEF SUMMARY

The present invention has been developed in response to the present state of the art, and in particular, in response to the problems and needs in the art that have not yet been met for facilitating I2C communication between a host device and a slave device where the slave device shares a common physical address with another slave device on the I2C bus. Accordingly, the present invention has been developed to provide an apparatus, system, and method for avoiding address conflicts between slave devices having a common physical address that overcomes many or all of the above-discussed shortcomings in the art.

An apparatus according to the present invention may include a detection module, a translation module, and a communication module. The detection module may detect an incoming address on an I2C bus. The translation module may then translate the incoming address to an outgoing address, and the communication module may communicate data between a host device and a slave device in response to the outgoing address matching a physical address of the slave device.

In one embodiment, the incoming address is made up of multiple binary bits, where the translation module serially translates each bit to an outgoing address. If a particular incoming address bit does not match a corresponding translation device address bit, the translation module may flip a corresponding bit of the outgoing address. In this manner, an incoming address that does not match the translation device address is translated to an outgoing address not recognized by the slave device. Where the incoming address matches the translation device address, however, the translation module may translate the incoming address to an outgoing address matching the physical address of the slave device. The communication module may then enable data communication between the host device and the slave device by way of, for example, a CMOS switch.

In one embodiment, the apparatus further includes a correspondence module to uniquely correspond a translation device address to the physical address of the slave device. The translation device address may include one or more I2C addresses. The correspondence module may further include means for selectively modifying the translation device address, such as external pins and/or microcode.

A system of the present invention is also presented to facilitate I2C communication between a host device and a commonly addressed slave device. The system may be embodied by a host device and a slave device in communication with the host device over an I2C bus, where the slave device shares a common physical address with at least one other slave device on the bus. A translation device may be connected to the I2C bus and sit intermediate the host device and the slave device to prevent address conflicts between the commonly addressed slave devices.

The host device may include, for example, a microcontroller, a microprocessor or a management module. The slave device may include, for example, RAM, EEPROM or an I/O device. As in the apparatus, the translation device of the present system may include a detection module, a translation module, and a communication module. In some embodiments, the translation device may further include a correspondence module to uniquely correspond one or more translation device addresses to the slave device.

A method of the present invention is also presented for facilitating I2C communication between a host device and a commonly addressed slave device. In one embodiment, the method includes detecting an incoming address on an I2C bus and translating the incoming address to an outgoing address. The method may further include communicating data between the host device and the slave device where the outgoing address matches a physical address of the slave device. As in the apparatus and system, translating may include flipping a binary bit of the outgoing address in response to a mismatch between a binary bit of the incoming address and a binary bit of a translation device address.

The present invention thus maximizes I2C hardware efficiencies and circuit simplicity while facilitating communication between a host device and a slave device sharing a common physical address with another slave device on the I2C bus. In this manner, the present invention also reduces costs and data transfer speed inefficiencies associated with dynamic addressing and other prior art methods for avoiding address conflicts in an I2C system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
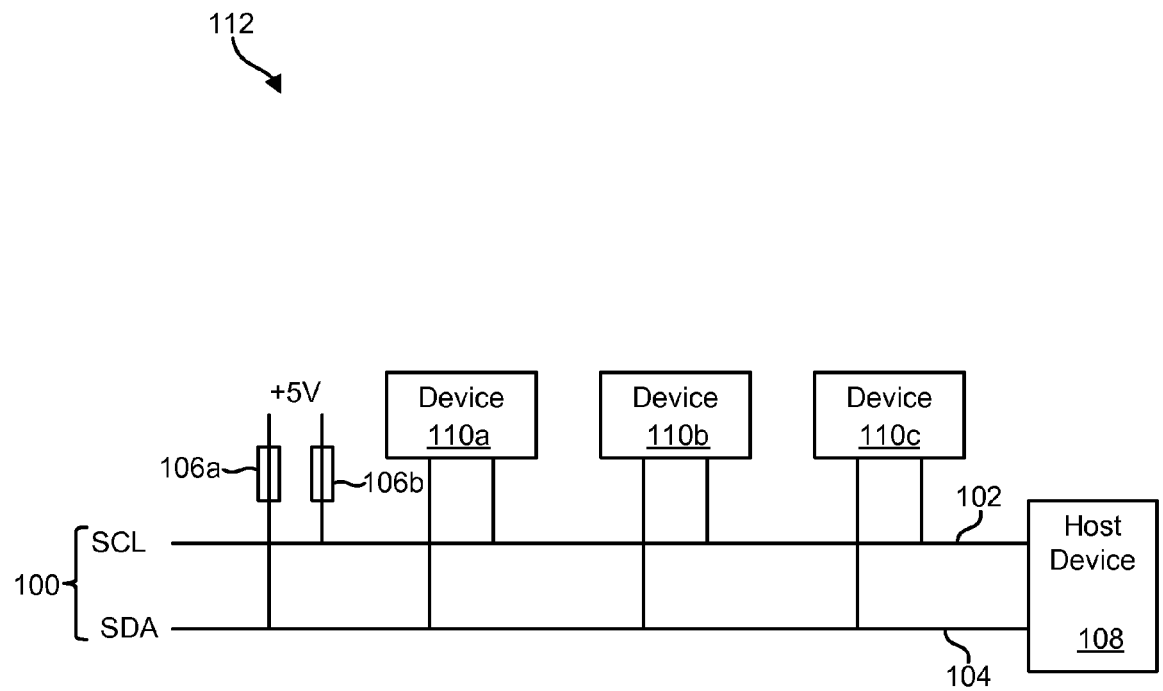
FIG. 1 is a schematic diagram illustrating a prior art I2C bus and devices linked thereto.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As used in this specification, the term "I2C bus" refers to an inter-integrated circuit bus consisting of a two-wire serial interface including a serial data line and a serial clock line. A "host device" refers to a device that drives the serial clock line and controls the transfer of data over the I2C bus. A "slave device" refers to a device that responds to the host device over the I2C bus. The term "hexadecimal," or simply "hex," refers to a numbering system which uses a base of sixteen. The first ten digits are 0-9 and the next six are A-F. The term "binary" refers to a numbering system with only two values, 0 and 1.

Referring now to FIG. 1, an I2C system in accordance with the present invention may comprise multiple devices connected to an I2C bus 100. An I2C bus 100 generally includes a clock line 102, a data line 104, and a common ground (not shown) such as a ground plane or separate wire. Both the clock line 102 and data line 104 are initially bi-directional, meaning that, in a particular system, both of these lines 102, 104 may be driven by an integrated circuit or an external device attached to the bus 100. Accordingly, both the clock line 102 and the data line 104 are "open drain" drivers, such that any device communicating over the bus 100 can drive the line 102, 104 low, but cannot drive it high.

External pull-up resistors 106a, 106b are thus needed to passively pull each line 102, 104 high when the bus 100 is idle. To put a signal on the bus 100, a device may drive its output transistor (not shown) to pull the line 102, 104 low. When the bus 100 is occupied by a device that has driven the line 102, 104 low, all other devices lose their ability to access the bus 100. This process both mandates serial transmission of data between devices and operates as an inherent arbitrator where two or more devices attempt to control the bus 100 simultaneously. Specifically, the device that pulls the line 102, 104 low during an arbitration event wins the arbitration.

As illustrated in FIG. 1, a device may comprise a host device 108 or a slave device 110a, 110b, 110c. While both a host device 108 and slave device 110a, 110b, 110c may act as a transmitter or receiver depending on its functionality, only a host device 108 can initiate a data transfer and control the clock line 102.

In some embodiments, an I2C system 112 may be adapted to include more than one host device 108. In this manner, the I2C system 112 may be considered a "multi-master" system. Despite this, only one host device 108 may be delegated the "master device," and thus initiate a data transfer, at any time. All other devices on the bus 100 are "slave devices" 110a, 110b, 110c that respond to the master device. For purposes of this specification, the terms host device 108 and master device may be used interchangeably to refer to a device that can initiate a data transfer and control the clock line 102.

A host device 108 in accordance with certain embodiments of the present invention may comprise a microcontroller, a microprocessor, a management module, or any other integrated circuit device known to those in the art. A slave device 110a, 110b, 110c may include, for example, a microprocessor, a hardware monitor, a clock generator, a memory device, an expansion card, a data converter, or any other integrated circuit device known to those in the art. In certain embodiments, the host device 108 may be internal to a central processing unit, server, or other processing device, while a slave device 110a, 110b, 110c may be peripherally or optionally added.

The host device 108 may initiate communication with a slave device 110a, 110b, 110c by putting a start sequence on the I2C bus 100. The start sequence signals each slave device 110a, 110b, 110c to listen for incoming data. The start sequence, like a stop sequence used to indicate the end of a particular transfer of data, is unique in that the data line 104 changes while the clock line 102 is pulsed high.

The host device 108 may then issue an address of a particular slave device 110a, 110b, 110c over the I2C bus 100. Each slave device 110a, 110b, 110c may receive the incoming address to determine whether the incoming address corresponds to its physical address. Where the incoming address matches its physical address, the slave device 110a, 110b, 110c will continue to receive the data transferred. All other slave devices 110a, 110b, 110c connected to the bus 100 will ignore the subsequent data and wait for the next start sequence.

To ensure accurate and efficient data communication in an I2C system 112, each slave device 110a, 110b, 110c connected to the I2C bus 100 must have a unique physical address. It is not uncommon, however, for more than one of the same slave device 110a, 110b, 110c to be connected to the same I2C bus 100. In such cases, multiple slave devices 110a, 110b, 110c may share a common physical address.

Figure 2:
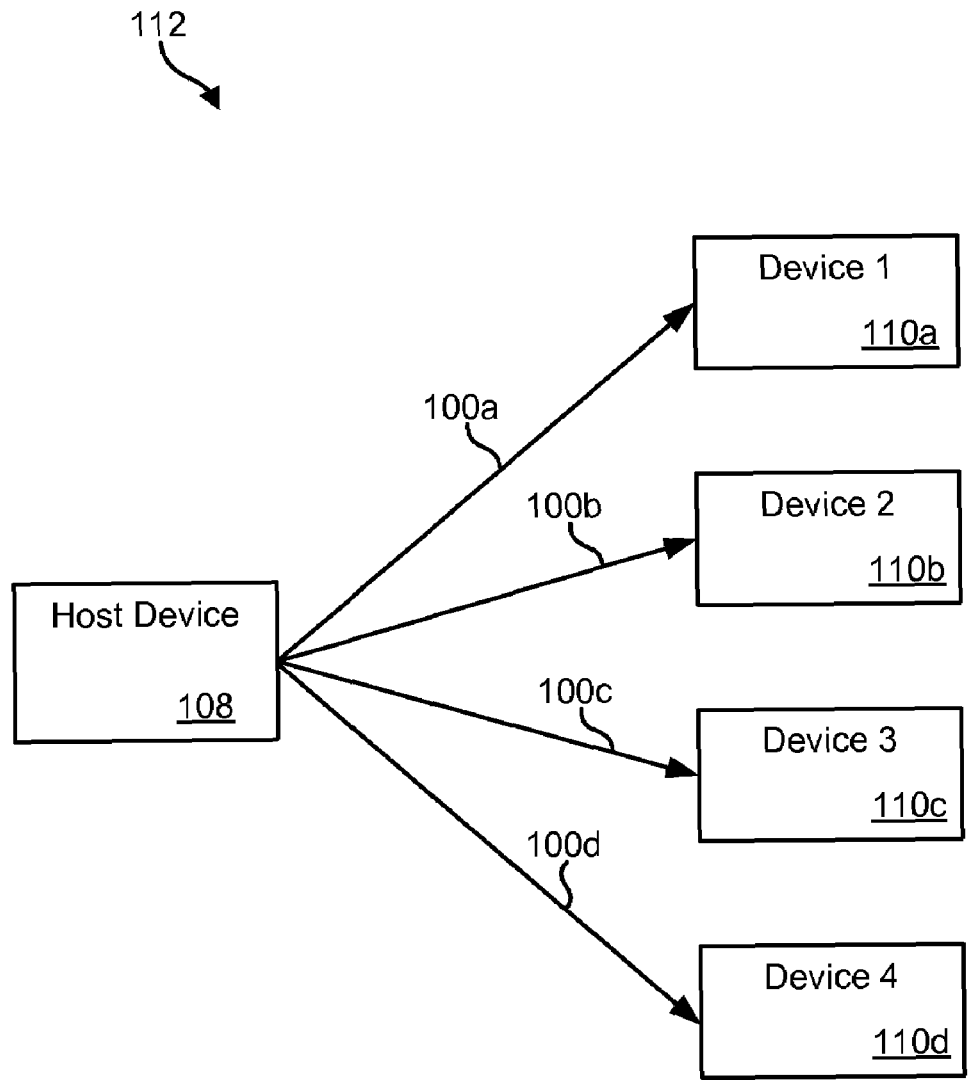
FIG. 2 is a schematic block diagram illustrating one prior art method for preventing I2C address conflicts between slave devices sharing a common physical address.

Referring now to FIG. 2, certain conventional I2C systems 112 implement multiple I2C buses 100a, 100b, 100c, 100d to avoid address conflicts where multiple slave devices 110a, 110b, 110c, 110d share a common physical address. For example, each slave device 110a, 110b, 110c, 110d may contain an EEPROM storing serial numbers and field replaceable unit ("FRU") information. Since most off-the-shelf EEPROMs reside in the same 8-bit addressing range, however, the slave devices 110a, 110b, 110c, 110d incorporating such EEPROMs may share a single common address.

Accordingly, each slave device 110a, 110b, 110c, 110d sharing a common address may be uniquely connected to an independent I2C bus 100a, 100b, 100c, 100d. In this manner, the host device 108 may uniquely identify each slave device 110a, 110b, 110c, 110d according to its corresponding bus 100a, 100b, 100c, 100d. While this solution effectively prevents address conflicts between commonly addressed slave devices 110a, 110b, 110c, 110d, it demands infinite hardware replication depending on the number of slave devices 110a, 110b, 110c, 110d sharing a common address. As a result, this solution both substantially increases costs, hardware and bulk associated with an I2C system 112.

Figure 3:
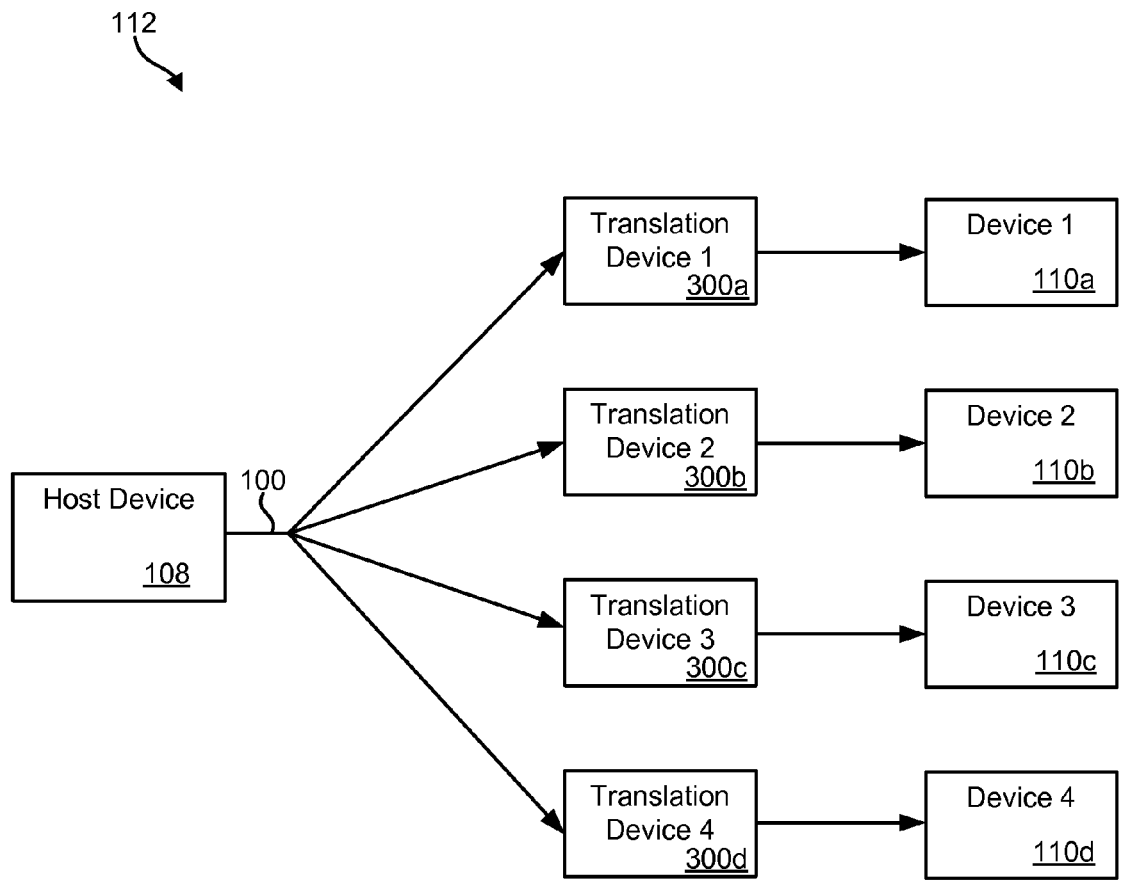
FIG. 3 is a schematic block diagram illustrating communication between a host device and commonly addressed slave devices having address translation devices implemented there between in accordance with certain embodiments of the present invention.

Referring now to FIG. 3, an I2C system 112 in accordance with the present invention may overcome the problems of the prior art by implementing an address translation device 300 to mediate communication between the host device 108 and a particular slave device 110a, 110b, 110c, 110d sharing a common address with another slave device 110a, 110b, 110c, 110d connected to the same I2C bus 100. In this manner, the present invention may facilitate data transfer speed and reliability while minimizing costs, hardware and complexities traditionally associated with address conflict avoidance techniques.

Specifically, an address translation device 300 in accordance with the present invention may connect to the I2C bus 100 at a position intermediate the host device 108 and a particular slave device 110a, 110b, 110c, 110d, such that each commonly addressed slave device 110a, 110b, 110c, 110d uniquely corresponds to exactly one address translation device 300a, 300b, 300c, 300d. Each address translation device 300a, 300b, 300c, 300d may be uniquely identified by a translation device address. In this manner, the host device 108 may distinguish between commonly addressed slave devices 110a, 110b, 110c, 110d according to their unique translation device 300a, 300b, 300c, 300d and associated translation device address.

As discussed in more detail below, data communication between the host device 108 and a particular slave device 110a, 110b, 110c, 110d in accordance with embodiments of the present invention may proceed in substantially the same manner as prior art systems, where the host device 108 issues a start sequence followed by an address. Where prior art systems rely on the slave devices 110a, 110b, 110c, 110d to listen for the start sequence and determine whether the incoming address matches their physical address, however, an I2C system 112 in accordance with the present invention may assign such tasks to an address translation device 300a, 300b, 300c, 300d uniquely associated with each particular slave device 110a, 110b, 110c, 110d.

Accordingly, each address translation device 300a, 300b, 300c, 300d listens for the start sequence and determines whether the incoming address matches its unique address translation device address. If so, the address translation device 300a, 300b, 300c, 300d may bridge communication between itself and its associated slave device 110a, 110b, 110c, 110d to enable subsequent data to flow through to the slave device 110a, 110b, 110c, 110d. If the incoming address does not match the unique address translation device address, the address translation device 300a, 300b, 300c, 300d ignores subsequent data and waits for the next start sequence.

Figure 4:
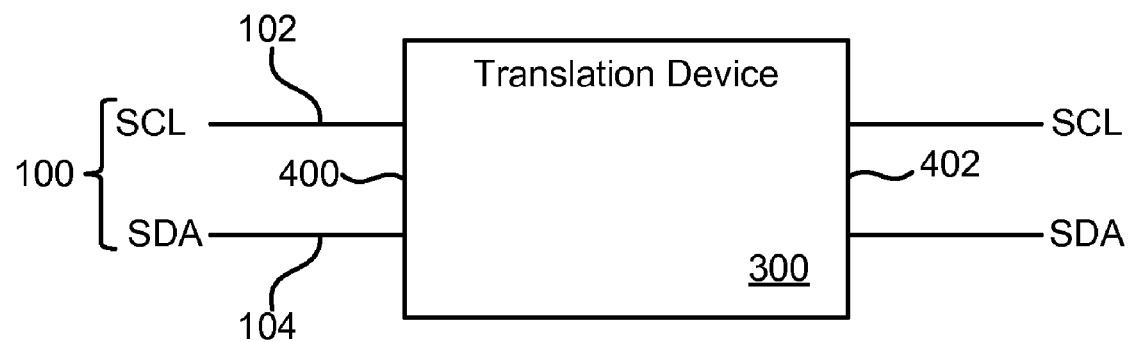
FIG. 4 is a schematic diagram of one embodiment of an address translation device in accordance the present invention.

Referring now to FIG. 4, an address translation device 300 in accordance with the present invention may comprise an application-specific integrated circuit ("ASIC"), a complex programmable logic device ("CPLD"), a microprocessor, or any other device known to those in the art. In some embodiments, an address translation device 300 may comprise a constituent component of a larger device. In such an embodiment, the larger device may interface with more than one commonly addressed slave device 110, while each address translation device 300 may be specific to a particular slave device 110. In other embodiments, the address translation device 300 may interface with more than one slave device 110, such as where multiple slave devices 110 are designated to receive identical data.

Embodiments of the address translation device 300 may comprise multiple I2C interfaces. Particularly, the address translation device 300 may comprise an incoming side 400 and an outgoing side 402, where the incoming side 400 interfaces with the host device 108 and the outgoing side 402 interfaces with the associated slave device or devices 110. In this manner, the address translation device 300 physically mediates the transmission of data on the data line 104 between the host device 108 and a slave device 110 associated with the address translation device 300.

Figure 5:
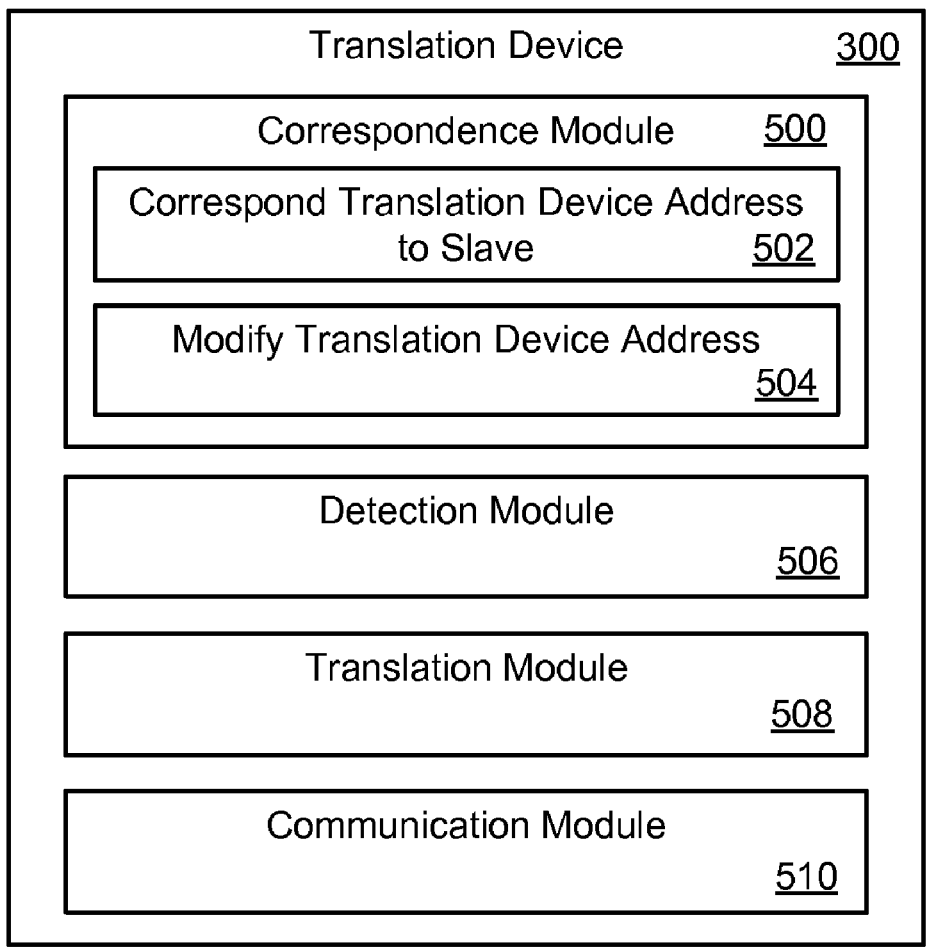
FIG. 5 is a block diagram illustrating various operational modules included in certain embodiments of the address translation device of the present invention.

Referring now to FIG. 5, an address translation device 300 in accordance with the present invention may generally comprise a detection module 506, a translation module 508, and a communication module 510. The detection module 506 may detect an incoming address on an I2C bus 100. In some embodiments, for example, the detection module 506 may listen for a start sequence to indicate that an incoming address is pending.

The translation module 508 may then translate the incoming address to an outgoing address. Specifically, the translation module 508 may reference a translation device address uniquely assigned to the address translation device 300. The translation device address may comprise a single I2C address, a range of I2C addresses, and/or selected I2C addresses. As each address translation device 300 uniquely corresponds to exactly one commonly addressed slave device 110, the translation device address enables the host device 108 to uniquely identify a particular slave device 110 by virtue of its associated address translation device 300.

In certain embodiments, the translation device address may comprise a plurality of binary bits. Likewise, the incoming address may also comprise a plurality of binary bits. Typically, both the translation device address and the incoming address comport with the 8-bit addressing scheme standard to most I2C systems 112. According to this scheme, each address is seven bits, with one read/write bit to indicate to the slave device 110 whether the host device 108 is writing to it or reading from it.

The translation module 508 may thus translate the incoming address in series, bit by bit. Specifically, in one embodiment, the translation module 508 may receive a first bit, "Bit 7," of the incoming address and compare it to Bit 7 of the translation device address. If there is a match, the translation module 508 may translate Bit 7 of the incoming address to Bit 7 of an outgoing address, such that Bit 7 of the outgoing address matches Bit 7 of the physical address of its associated slave device 110. If Bit 7 of the incoming address does not match Bit 7 of the translation device address, the translation module 508 may invert or flip Bit 7 of the outgoing address. As a result, the outgoing address will not match the physical address of the associated slave device 110. In this manner, the translation module 508 of the present invention may accurately and predictably translate an incoming address to an outgoing address. This process is discussed in more detail below with reference to FIGS. 6 and 7.

Finally, the communication module 510 may communicate data between the host device 108 and the slave device 110 in response to the outgoing address matching the physical address of the slave device 110. In some embodiments, the communication module 510 may comprise a complementary metal oxide semiconductor ("CMOS") switch, a field effect transistor ("FET"), or other device known to those in the art adapted to bridge a connection between the I2C bus 100 and the slave device 110. The communication module 510 may maintain a connection between the I2C bus 100 and the slave device 110 until a stop sequence is received from the host device 108, indicating that data transmission has ended. Further, the communication module 510 may enable the host device 108 to receive an acknowledgement from the slave device 110 indicating that the slave device 110 received the data.

In some embodiments, the address translation device 300 may further include a correspondence module 500 to uniquely correspond 502 a translation device address to the common physical address of the slave device 110. The correspondence module 500 may correspond a single unique I2C address to the physical address, or may correspond a range of I2C addresses and/or multiple selected I2C addresses thereto. In any case, the correspondence module 500 may enable the host device 108 to uniquely identify a certain commonly addressed slave device 110 by directing data to the corresponding translation device address.

In one embodiment, the correspondence module 500 may further enable a user to modify 504 the translation device address assigned to correspond to a particular commonly addressed slave device 110. Specifically, a user may selectively modify 504 the translation device address by adjusting external pins, inputting or modifying microcode, or by any other means known to those in the art. In certain embodiments, a user may modify 504 the translation device address dynamically to accommodate added or changed I2C system 112 components or devices while minimizing any interruption in data transmission. Alternatively, the translation device address corresponding to a particular commonly addressed slave device 110 may be hard-coded into the address translation device 300.

Figure 6:
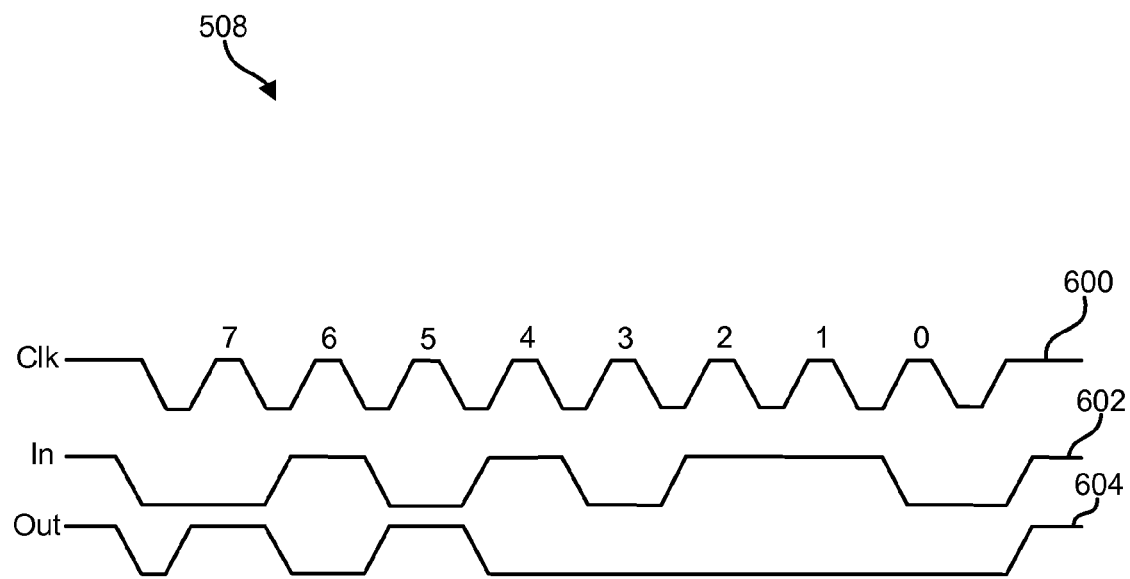
FIG. 6 is a diagram detailing translation of an incoming signal to an outgoing signal in accordance with certain embodiments of the present invention.

Referring now to FIG. 6, translation of the incoming address to an outgoing address by the translation module 508 of the present invention may effectively translate an incoming data signal 602 to an outgoing data signal 604. In one embodiment, for example, the incoming address may be read as 0x56 in hex, or 0101 0110 in binary. This address is reflected by the incoming data signal 602. Specifically, at the clock pulse 600 corresponding to Bit 7, the incoming signal 602 is pulled low. At Bit 6, the incoming signal 602 goes high. At Bit 5 it is low, at Bit 4 it is high. Likewise, at Bit 3 the incoming signal 602 is low, while at Bits 2 and 1 it is high. At Bit 0, the incoming signal 602 is low.

As bytes are sent high-order bit first, the translation module 508 generally translates each bit of the incoming address in the same order, high-order bit first. Moreover, in certain embodiments the translation module 508 ignores the read/write bit of the incoming address, typically located at Bit 0. Accordingly, a "read" indication remains a "read" indication and a "write" indication remains a "write" indication, despite translation of the remaining bits of the incoming address.

Continuing with the present example, where the translation device address is also represented by 0x56, the translation module 508 may translate the incoming address to an outgoing address matching the physical address of its associated slave device 110. In this example, the physical address of the slave device 110 is represented as 0xA0, or 1010 0000. Accordingly, the outgoing address and corresponding outgoing signal 604 may reflect the physical address 0xA0.

Specifically, at the clock pulse 600 corresponding to Bit 7, the outgoing signal 604 is high. The outgoing signal 604 is low at Bit 6 and high at Bit 5. At Bits 4 to 0, the outgoing signal 604 is pulled low. In this manner, the translation module 508 of the present invention translates both an incoming address to an outgoing address, and an incoming signal 602 to an outgoing signal 604.

Figure 7:
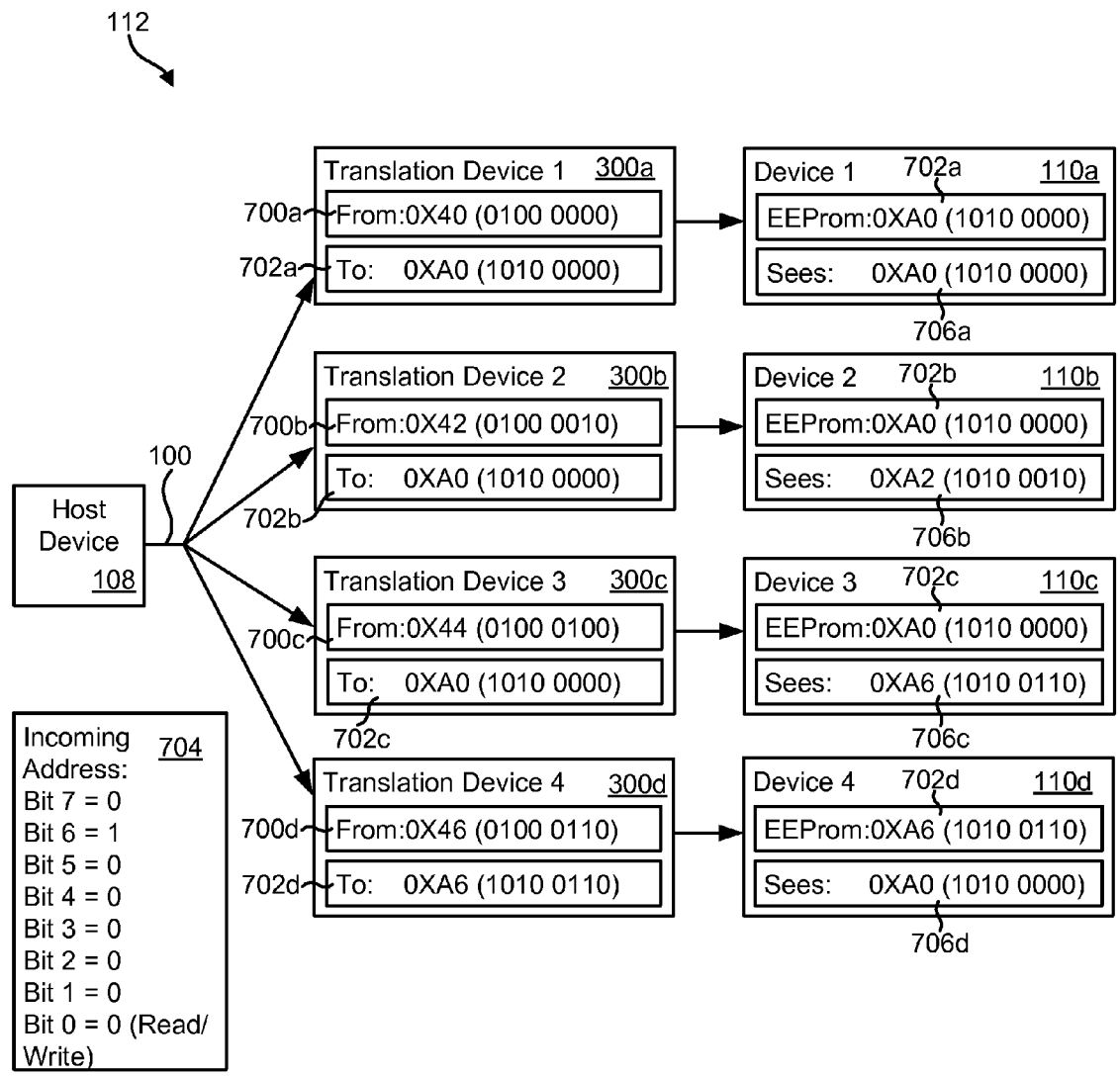
FIG. 7 is a schematic block diagram detailing one example of data communication over an I2C bus between a host device and a slave device sharing a common physical address with other slave devices in accordance with the present invention.

FIG. 7 provides a detailed example illustrating overall operation of an address translation device 300 in accordance with the present invention. As shown, a host device 108 may wish to communicate with a particular slave device 110a over an I2C bus 100. To avoid address conflicts between this slave device 110a and other slave devices 110b, 110c, 110d sharing a common physical address and connected to the same I2C bus 100, address translation devices 300a, 300b, 300c, 300d may be implemented to mediate communication between the host device 108 and each commonly addressed slave device 110a, 110b, 100c, 110d. Particularly, a first translation device 300a may interface with the host device 108 and a first slave device 110a, a second translation device 300b may interface with the host device 108 and a second slave device 110b, a third translation device 300c may interface with the host device 108 and a third slave device 110c, and a fourth translation device 300d may interface with the host device 108 and a fourth slave device 110d. In this manner, each address translation device 300a, 300b, 300c, 300d uniquely corresponds to a commonly addressed slave device 110a, 110b, 110c, 110d.

A correspondence module 500 integral to each translation device 300a, 300b, 300c, 300d may uniquely correspond a translation device address 700a, 700b, 700c, 700d thereto. Each translation device 300a, 300b, 300c, 300d may further include a physical address 702a, 702b, 702c, 702d corresponding to its associated slave device 110a, 110b, 110c, 110d. While the exemplary embodiment illustrated by FIG. 7 includes only slave devices 110 sharing a common physical address, one skilled in the art will recognize that an address translation device 300 may also implemented to mediate communication between a host device 108 and a slave device 110 having a unique physical address.

As provided by the exemplary embodiment of FIG. 7, the host device 108 may issue a start sequence followed by an incoming address 704. Each of the translation devices 300a, 300b, 300c, 300d may listen for the start sequence and incoming address 704 to determine whether the incoming address 704 matches its translation device address 700a, 700b, 700c, 700d.

In the case of the first address translation device 300a depicted by FIG. 7, the detection module 506 of the translation device 300a listens for and receives the incoming address 704. The translation module 508 then translates, bit by bit, the incoming address 704 to an outgoing address 706a. In this case, the incoming address 704 is represented as 0x40, which matches the translation device address 700a, 0x40. Because each bit of the incoming address 704 matches a corresponding bit of the translation device address 700a, the outgoing address 706a, 0xA0, corresponds to the physical address 702 of the slave device 110a associated therewith. Once the translation module 508 translates the incoming address 704 to the outgoing address 706a, the translation module 508 function terminates. The communication module 510 of the first translation device 300a then bridges communication between the host device 108 and the first slave device 110a such that the first slave device 110a may receive data from the host device 108, and the host device 108 may receive an acknowledgement from the slave device 110a in response thereto.

In the case of the second address translation device 300b, the detection module 506 of the translation device 300b similarly listens for and receives the incoming address 704. In this case, however, the incoming address 704, 0x40, does not match the translation device address 700b, 0x42. As a result, the translation module 508 translates the incoming address 704 to an outgoing address 706b that does not match the physical address 702b of the associated slave device 110b. The communication module 510 thus fails to bridge communication between the host device 108 and the slave device 110b. Subsequent data sent by the host device 108 is thus effectively ignored by the address translation device 300b, and never received by the associated slave device 110b.

According to one aspect of the present invention, the translation module 508 reverses a bit of the outgoing address 706b in response to a mismatch between a bit of the incoming address 704 and a corresponding bit of the translation device address 700b. Accordingly, in the case of the second address translation device 300b, translation may proceed as follows. Specifically, because Bit 7 of the incoming address 704 matches Bit 7 of the translation device address 700b, the translation module 508 may translate Bit 7 of the outgoing address 706b to reflect Bit 7 of the physical address 702b of its associated slave device 110b, namely, a binary "1." Bit 6 of the incoming address 704 likewise matches Bit 6 of the translation device address 700b. Accordingly, Bit 6 of the outgoing address 706 may accurately reflect Bit 6 of the physical address 702b, namely, a binary "0."

This process may continue until Bit 1. Bit 1 of the incoming address 704 does not match Bit 1 of the translation device address 700b. Accordingly, where the physical address 702b includes a binary "0" at Bit 1, the translation module 508 may flip a corresponding bit of the outgoing address 706b, such that Bit 1 of the outgoing address 706b is a binary "1" instead of a binary "0." In this manner, the resulting outgoing address 706b may be read as 0xA2, where the physical address 702b of the associated slave device 110b is 0xA0. Since the outgoing address 706b does not match the physical address 702b, subsequent data sent by the host device 108 is effectively ignored by the address translation device 300b, and never received by the associated slave device 110b.

Though translation device addresses 700c and 700d differ for the third and fourth translation devices 300c and 300d and their associated slave devices 110c and 110d, translation device function is essentially the same as for the second translation device 300b. Particularly, because the incoming address 704 does not match the translation device address 700c, 700d, a resulting outgoing address 706c, 706d will not match the appropriate physical address 706c, 706d. Subsequently transmitted data will thus be ignored by the translation devices 300c and 300d, and will not be received by the associated slave devices 110c and 110d.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate communication over an Inter-Integrated Circuit (I2C) bus between a host device and a slave device, the apparatus comprising:

a detection module to detect an incoming address of a data transmission at a translation device, the data transmission being received over an I2C bus from a host device, the data transmission intended for a first slave device connected to the translation device over an I2C bus, the first slave device sharing a common physical address with one or more other slave devices;

a translation module to translate bits of the incoming address of the data transmission to an outgoing address, wherein the outgoing address matches the physical address in when the incoming address matches a translation device address of the translation device; and a communication module to communicate the outgoing address and data of the data transmission to the first slave device over the I2C bus, wherein the first slave device receives data preceded by the common physical address and ignores data preceded by an address other than the common physical address.

2. The apparatus of claim 1, further comprising a correspondence module to uniquely correspond the translation device address to the physical address of the slave device.

3. The apparatus of claim 2, wherein the translation device address comprises more than one I2C address and is connected to two or more slave devices, the slave devices sharing a common physical address, each slave device connected to an output of the translation device, each I2C address corresponding to a slave device.

4. The apparatus of claim 2, wherein the correspondence module further comprises means for selectively dynamically modifying the translation device address.

5. The apparatus of claim 4, wherein the means for selectively modifying the translation device address comprises at least one of external pins and microcode.

6. The apparatus of claim 1, wherein the incoming address comprises a plurality of binary bits.

7. The apparatus of claim 6, wherein the translation module serially translates each of the plurality of binary bits to form the outgoing address.

8. The apparatus of claim 7, wherein the translation module flips the each binary bit in the incoming address in response to a mismatch between the each binary bit and a binary bit corresponding to the translation device address.

9. The apparatus of claim 1, wherein the communication module comprises a CMOS switch to selectively communicate data between the host device and the slave device.

10. A system to facilitate communication over an I2C bus between a host device and a slave device, the system comprising:

a host device;

a slave device in communication with the host device over an I2C bus, the slave device sharing a common physical address with at least one other slave device on the I2C bus; and a translation device located between the host device and the slave device and connected to the I2C bus, the translation device comprising:

a detection module to detect an incoming address of a data transmission to the slave device, the incoming address being received over the I2C bus;

a translation module to translate bits of the incoming address of the data transmission to an outgoing address, wherein the outgoing address matches the physical address in when the incoming address matches a translation device address of the translation device; and a communication module to communicate the outgoing address and data of the data transmission to the slave device over the I2C bus, wherein the slave device receives data preceded by the common physical address and ignores data preceded by an address other than the common physical address.

11. The system of claim 10, wherein the host device is selected from the group consisting of a microcontroller, a microprocessor, and a management module.

12. The system of claim 10, wherein the slave device is selected from the group consisting of a RAM, an EEPROM and an I/O device.

13. The system of claim 10, wherein the translation device further comprises a correspondence module to uniquely correspond the translation device address to the physical address.

14. The system of claim 13, wherein the translation device address comprises more than one I2C address and is connected to two or more slave devices, the slave devices sharing a common physical address, each slave device connected to an output of the translation device, each I2C address corresponding to a slave device.

15. The system of claim 13, wherein the correspondence module further comprises means for selectively dynamically modifying the translation device address.

16. The system of claim 10, wherein the incoming address comprises a plurality of binary bits.

17. The system of claim 16, wherein the translation module serially translates each of the plurality of binary bits to form the outgoing address.

18. The system of claim 17, wherein the translation module flips the each binary bit in the incoming address in response to a mismatch between the each binary bit and a binary bit corresponding to the translation device address.

* * * * *